United States Patent [19]

Smith

[11] 4,299,664

[45] Nov. 10, 1981

[54] VAPOR DEGREASER

[75] Inventor: Jeffrey C. Smith, Prospect, Conn.

[73] Assignee: Branson Ultrasonics Corporation, New Canaan, Conn.

[21] Appl. No.: 210,274

[22] Filed: Nov. 26, 1980

[51] Int. Cl.³ .............................................. B01D 3/42
[52] U.S. Cl. .................................... 202/170; 202/206
[58] Field of Search ............... 202/160, 163, 168–170, 202/182, 185 R, 185 C, 185 E, 187, 189, 190, 191, 206, 232, 235; 62/113, 115, 118, 132, 183, 184, 196 R, 196 C, 196 B, 197, 199, 200, 207, 267

[56] References Cited

U.S. PATENT DOCUMENTS 3,371,500  3/1968  Marcus .................................. 62/117
4,003,798  1/1977  McCord .............................. 202/160

*Primary Examiner*—Frank Sever
*Attorney, Agent, or Firm*—Ervin B. Steinberg; Philip J. Feig

[57] ABSTRACT

A vapor degreaser continually vaporizes and condenses a solvent bath and comprises two closed water loops associated with a refrigeration system. The water loops provide thermal storage for the degreaser and conduct heat to the solvent bath for heating the solvent and from the solvent vapors for condensing the vapors. The degreaser includes auxiliary heating and cooling coils which may be rendered totally inoperative when their operation is not energy efficient.

2 Claims, 1 Drawing Figure

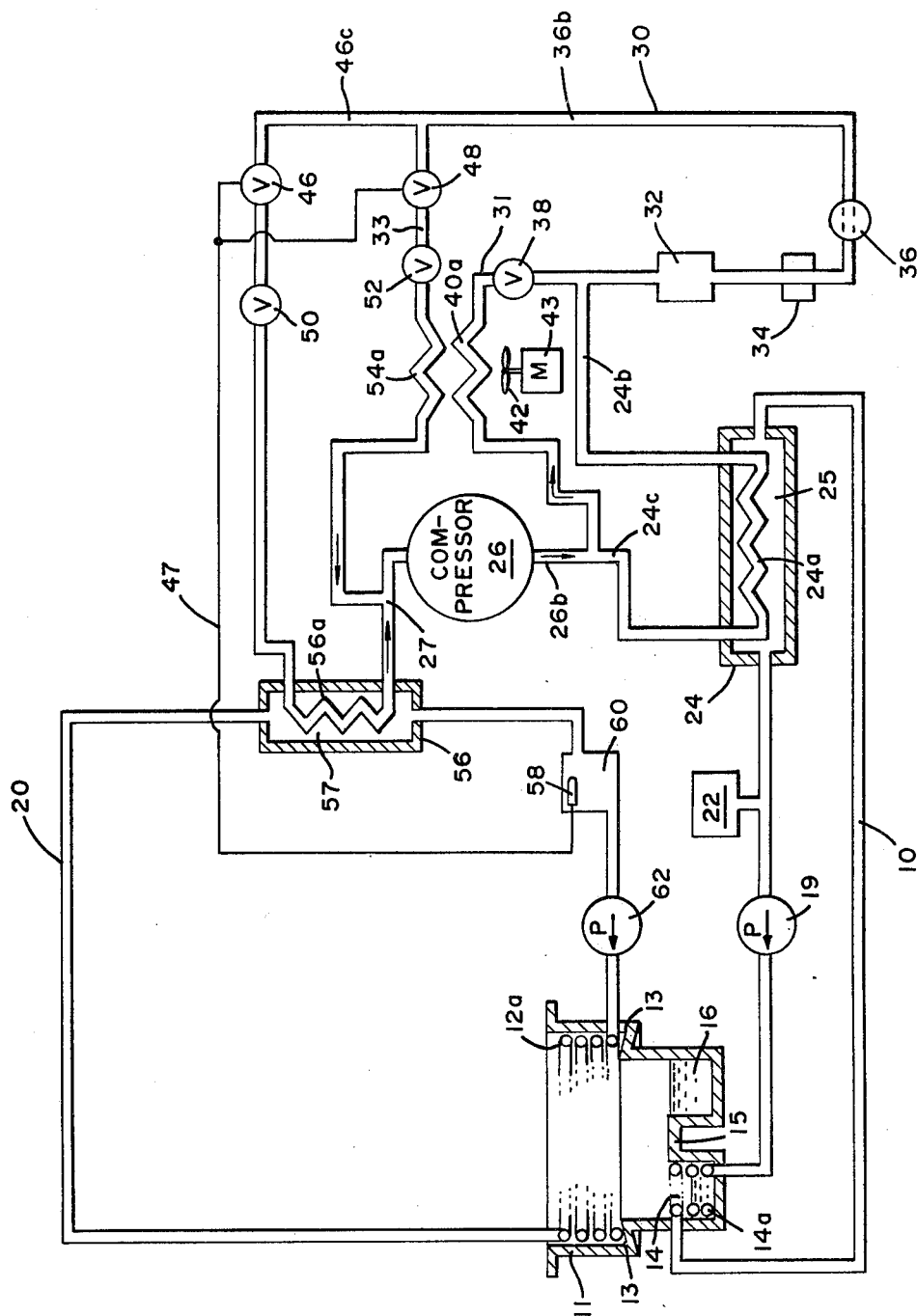

VAPOR DEGREASER

BRIEF SUMMARY OF THE INVENTION

This invention relates to an apparatus utilizing a bath of boiling solvent for cleaning workpieces or distilling solvent. More specifically, the present invention concerns the energy efficient removal of soluble particulate matter from soiled workpieces to be cleaned by first immersing the workpieces into the boiling solvent and then exposing them to vapors released by the boiling solvent. During the cleaning operation, the boiling solvent is continually vaporized and condensed so as to be recycled.

Prior art vapor degreasing devices disclose attempts to utilize energy efficiently while cleaning workpieces, see for example, U.S. Pat. No. 4,003,798 issued to James W. McCord, dated Jan. 18, 1977 entitled "Vapor Generating and Recovering Apparatus." These devices, however, have not proven entirely satisfactory. Prior art devices generally rely upon a refrigeration system utilizing a primary heat transfer fluid or refrigerant, such as dichlorodifluoromethane (Freon), to directly conduct heat energy to the solvent bath, thereby causing the solvent to boil and vaporize. Moreover, prior art devices utilize the refrigerant in an evaporator coil which contacts the solvent vapor, causing the vapor to condense or cool to a liquid which is recycled back into the solvent bath. The use of a refrigerant as a primary heat transfer fluid in both the heating and cooling sections of the apparatus necessitates coils and conduits containing the low boiling point refrigerant at a high pressure to be disposed within the apparatus. This arrangement presents a safety hazard if the coils or conduits rupture or are inadvertently punctured. Such a safety hazard is particularly evident while the pressurized refrigerant flows through the portion of the apparatus in which the boiling solvent is disposed, namely, the boiling sump of a vapor degreaser.

Further, prior art devices have proved to be less energy efficient during startup and also under heavy load conditions. Such devices, for example, employ a continually operational complementary (auxiliary) heat exchange means or auxiliary condenser for dissipating or emitting excess heat energy from the refrigeration system to the ambient atmosphere in an attempt to maintain a balanced and energy efficient operation of the device, see the McCord patent, supra. Thus, some heat energy is always dissipated from the system by the auxiliary condenser. This continuous heat dissipation proves energy inefficient when a part or all of the dissipated heat energy must be provided from external energy sources in order to maintain the thermodynamically balanced operation of the device.

In the present invention, a conventional refrigeration system including an evaporator and a condenser circulates a refrigerant such as Freon. Associated with both the condenser and evaporator of the conventional refrigeration system is a respective loop system for coupling the heat energy from the condenser to the solvent in the boiling sump of the vapor degreaser and another loop system for coupling the cooling from the evaporator to the solvent vapors in the vapor degreaser. The liquid circulation in these two loops is maintained at a low pressure which is safe in the event of rupture or accidental puncture of the coils and conduits disposed in the tank. The present apparatus, therefore, utilizes a binary system comprising three self-contained loops. A refrigeration system loop conducts a refrigerant and two primary liquid loops conduct a primary heat transfer liquid, preferably water, to the coils and conduits within the tank. The liquid in both of the primary liquid loops may be the same or different. Preferably, both primary loops circulate the same liquid, usually water, because of the high boiling point of water in relation to most commonly used solvents. That is, the water can be heated to a sufficiently high temperature by the condenser to cause the solvent in the sump to boil without the circulating water itself being in a boiling state.

The amount of heat energy required to boil the solvent varies with the work load. Less heat is required to maintain the boiling status of a quiescent reservoir of solvent than is required to maintain the solvent boiling when ambient temperature workpieces are continuously placed into and removed from the reservoir. In order to provide the additional heat when required but also to operate at an optimal energy efficiency, an auxiliary evaporator is used in the refrigeration system. Further, the presence of excess heat energy produced, for example, by the continuous heat of compression of the compressor in the refrigeration system with varying work loads, causes a thermodynamic imbalance in the system. In order to compensate for this energy imbalanced condition, the refrigeration system of the present invention includes an auxiliary condenser for automatically dissipating excess heat energy. The auxiliary condenser is switched completely out of operation when there is no need to dissipate any excess heat energy.

With suitable sensors as hereinafter described, the auxiliary evaporator and the auxiliary condenser may be switched in or out of the refrigeration system for the purpose of extracting heat from the ambient atmosphere or dissipating heat into the ambient atmosphere as is required to maintain the necessary thermodynamic equilibrium for the desired energy efficient operation of the degreasing apparatus with varying work loads.

The provision in the present invention of means to completely disengage the auxiliary condenser from operation enhances energy efficient operation of the degreaser when contrasted with the prior art. Also, heat energy stored from the ambient atmosphere in the primary heat transfer liquid disposed within the primary liquid loops increases the efficiency of the present apparatus by providing a readily available source of thermal energy within the apparatus itself.

A principal object of the present invention, therefore, is the provision of an energy efficient vapor degreasing apparatus.

A further object of this invention is the provision of a degreasing apparatus which simultaneously increases operator safety while operating in an energy efficient manner.

Further and still other objects of the present invention will be more readily apparent from the following description when taken in conjunction with the accompanying drawing.

BRIEF DESCRIPTION OF THE DRAWING

The sole FIGURE is a schematic diagram of a preferred embodiment of the vapor degreasing apparatus comprising the present invention.

DETAILED DESCRIPTION OF THE INVENTION

Referring now to the sole FIGURE, there is shown a degreasing apparatus comprising a metal tank or housing 11 containing a liquid chamber or boiling sump 14 in which a reservoir or bath of solvent is boiled. As the solvent boils, vapors rise above the level of the liquid solvent. The vapors condense upon contact with the cooling coils 12a disposed around the inside perimeter of the tank 11. A second sump 16 collects the condensed solvent from a lip 13 disposed under the coils 12a. A weir 15 of preselected height disposed between sumps 14 and 16 defines the liquid level of condensed solvent collected within the sump 16. The use of low boiling point solvents in the fluorocarbon or hydrocarbon family, such as dichloromethane, is preferred.

A first closed loop 10 for conducting a primary heat transfer liquid, specifically water or a water based liquid, through heating coils 14a, which are suitably disposed in the sump 14 for causing boiling of the solvent therein, comprises a pump 19 which discharges water which has been heated to a sufficient temperature to cause the solvent in sump 14 to boil, heating coils 14a, the condensing space 25 of a condenser 24 and a liquid expansion storage tank or reservoir 22 in addition to piping connecting the elements together. The primary heat transfer liquid must have good thermal properties and have a boiling point higher than the temperature necessary to cause the solvent in sump 14 to boil.

A second closed loop 20 for conducting a second primary heat transfer liquid, specifically water or a water based liquid, through the cooling coils 12a comprises a pump 62 which discharges water which has been lowered to a temperature sufficient to condense the solvent vapors rising in the tank 11, cooling coils 12a, the evaporator space 57 of an evaporator 56 and liquid reservoir 60 in addition to piping connecting the elements together. The position of the coils 12a defines the vapor and freeboard zones within the tank 11. A temperature sensor 58 is disposed within liquid reservoir 60 and is preset to generate a signal responsive to a predetermined below-ambient temperature of the water within the reservoir 60.

A third closed refrigeration loop 30 for conducting a refrigerant, such as Freon, comprises a compressor 26 of the type commonly used in refrigerating systems, condensing coils 24a of the condenser 24, liquid refrigerant receiver 32, dryer 34, moisture indicator (sight glass) 36, temperature controlled solenoid valve 46 which is coupled to the sensor 58 by means of conductor 47, thermal expansion valve 50, the coils 56a of the evaporator 56 and return piping (conduit) 27 to the compressor 26 in addition to piping connecting the elements together. The refrigerant is compressed to a preselected pressure by the compressor 26. The pressurized refrigerant then passes through the condenser 24 wherein the refrigerant emits or dissipates its heat energy to the water pumped through the condensing space 25 of the condenser 24. Condensed refrigerant then flows through receiver 32, dryer 34, sight glass 36, normally open valve 46, thermal expansion valve 50, evaporating coils 56a, and then through return piping 27 to the compressor 26. Thermal expansion valve 50 lowers the pressure of the refrigerant to a preselected level so as to allow the refrigerant to absorb the heat energy dissipated by the water pumped through the evaporator space 57. The refrigerant conducted through loop 30, therefore, absorbs heat energy within the evaporator 56 and the compressor 26 and emits or dissipates heat energy within the condenser 24.

An auxiliary condenser or bypass branch 31 is coupled with its input end to a point between the intake piping 24c of condenser 24 and the discharge piping 26b of the compressor 26. The output of this branch is coupled to a point between the exit piping 24b of the condenser 24 and the input of the receiver 32. The auxiliary condenser or bypass branch 31, therefore, is coupled to loop 30 and is in parallel with the condensing coils 24a. The branch 31 comprises the series connection of auxiliary condensing coils 40a and a pressure regulating valve 38. Coils 40a are thermally coupled to the ambient atmosphere. When the pressure sensed by regulating valve 38 exceeds a preset value, the valve 38 opens and allows an amount of refrigerant to flow through the branch 31 to the receiver 32 instead of flowing through the condenser 24. The valve 38 opens only when necessary to dissipate excess heat energy from the refrigerant to the ambient atmosphere in order to maintain the thermodynamic balance of the system in an optimally energy efficient manner. A fan 42 is disposed near auxiliary condensing coils 40a and is connected to a motor 43 which rotates the fan at a constant speed. The constant speed of rotation of fan 42 aids the dissipation of heat energy by the refrigerant within coils 40a to the ambient atmosphere.

An auxiliary evaporator or bypass branch 33 is coupled with its input end between the exit piping 36b from sight glass 36 and the entrance piping 46c to the solenoid valve 46. The output end of branch 33 is coupled to the compressor return piping 27. Auxiliary branch 33, therefore, is coupled to loop 30 and is in parallel with the valves 46 and 50 and evaporating coils 56a. Branch 33 comprises in series a normally closed solenoid controlled valve 48 which is coupled by means of conductor 47 to the temperature sensor 58 and switched open and closed in response to a signal therefrom, thermal expansion valve 52 which lowers the pressure of the refrigerant to a preset level and auxiliary evaporating coils 54a which are thermally coupled to the ambient atmosphere. Refrigerant will flow through the auxiliary evaporator branch 33, i.e. through valves 48 and 52 and then coils 54a, only if necessary to maintain the refrigeration system thermodynamic balance in an optimally energy efficient manner with increased work loads.

When the temperature sensor 58 detects a temperature at or below a predetermined value, valve 48 in bypass 33 is switched open and valve 46 in refrigeration loop 30 is switched closed. Thus, the refrigerant in piping section 36b is conducted through the auxiliary evaporating coils 54a into the compressor 26 instead of through the evaporating coils 56a. In this manner, heat is absorbed by the refrigerant from the ambient atmosphere through coils 54a instead of from the water within loop 20 through coils 56a. Auxiliary coils 54a are disposed near the constant speed fan 42 which aids in the exchange of heat energy from the ambient atmosphere to the refrigerant flowing through the evaporating coils 54a.

DESCRIPTION OF THE OPERATION

Referring again to the sole FIGURE, a solvent bath whose vapors are used to degrease workpieces placed within the degreasing apparatus is disposed within the boiling sump 14. Throughout the operation of the present apparatus as hereinafter described, compressor 26 continually compresses a refrigerant to a preselected high pressure while pumps 19 and 62 pump water or the like at a low pressure and constant rate through respective liquid loops 10 and 20 which conduct heat energy to the coils 14a to vaporize the solvent and to the coils 12a to condense the solvent vapors.

During a startup time period when no workpiece is present in the boiling sump 14, compressor 26 compresses a suitable refrigerant, such as Freon 12, which is conducted within the refrigerant loop 30. The compressor imparts its heat of compression to the refrigerant. The hot pressurized refrigerant discharged from the compressor 26 then flows through piping 26b and 24c to the condensing coils 24a disposed within the condenser 24. Within condenser 24, the hot pressurized refrigerant transfers its heat energy to the water pumped by pump 19 through the condenser space 25 of the condenser 24. The refrigerant is thereby condensed within the coils 24a. The temperature of the water within loop 10 begins to rise. The heat energy absorbed by the water in the condenser 24 is conducted through loop 10 to the heating coils 14a of the boiling sump 14. The temperature of the solvent thereby begins to rise. When sufficient heat is transfered from the refrigerant to the water the solvent in sump 14 will boil.

From the condensing coils 24a, the condensed refrigerant flows through piping 24b, through liquid refrigerant receiver 32, dryer 34, moisture indicator 36, piping 36b and 46c through the solenoid controlled valve 46 which is normally open. Valve 46 is controlled by the temperature responsive signal from the temperature sensor 58 disposed within liquid reservoir 60. The pressurized refrigerant then passes through thermal expansion valve 50 which suitably lowers the refrigerant pressure, evaporating coils 56a and return piping 27 to the compressor 26. The refrigerant absorbs heat energy from the ambient temperature water pumped through the loop 20 in the evaporator space 57 of the evaporator 56. Thus, the temperature of the water conducted through loop 20 including cooling coils 12a begins to decrease while the heated water pumped through the coils 14a of loop 10 dissipates its heat energy to the solvent bath thereby causing the solvent temperature to rise. The cooled water pumped through cooling coils 12a is available to condense the vapor once the solvent boils and vaporizes. Further, the water within loops 10 and 20 provides readily accessible heat energy to the refrigeration system and increases the energy efficiency of the present apparatus.

At the end of the startup time period, the solvent within the boiling sump 14 begins to boil and vaporize. As the vaporized solvent rises within the tank 11 and contacts the cooling coils 12a, the vapor is condensed by dissipating heat energy to the cooler water being conducted through the cooling coils 12a of loop 20. Lip 13 transports the condensed solvent to the sump 16. The heat energy absorbed by the water pumped through loop 20 is conducted to the evaporator space 57 of the evaporator 56 wherein the heat energy is absorbed by the low pressure refrigerant within the evaporating coils 56a prior to the refrigerant flowing through return piping 27 to the compressor 26. Compressor 26 imparts additional heat of compression or heat energy to the refrigerant.

The continuous adding of heat energy from the compressor 26 creates a condition of high temperature and pressure in the refrigerant loop 30 such that an amount of heat must be dissipated from the refrigerant in order to maintain a balanced system. Upon the occurrence of this high pressure condition within the refrigerant loop 30, pressure regulating valve 38 opens and allows an amount of refrigerant to flow through the auxiliary condenser branch 31 which dissipates the excess heat to the ambient atmosphere through the auxiliary condensing coils 40a. Constant speed fan 42 aids the heat dissipation. The remaining refrigerant which does not flow through branch 31 flows through the condensing coils 24a and the remainder of loop 30 to the compressor 26. Thus, the present apparatus reaches an equilibrium condition during which the solvent is continuously vaporized by the heating coils 14a and the vapors are continuously condensed by the cooling coils 12a disposed within the tank 11 while excess heat energy is dissipated to the ambient atmosphere via the refrigerant flow through the auxiliary condenser branch 31.

When a workpiece to be cleaned or degreased is placed into the boiling sump 14, a portion of the heat energy from the vapors is absorbed by the workpiece. That is, the solvent vapors condense on the workpiece and permit the water within loop 20 to absorb less heat energy thus lowering the temperature of the water within loop 20. This lowered water temperature produces a corresponding pressure drop within the refrigerant loop 30 and causes the preset pressure valve 38 to close commensurate with the lower pressure within the refrigerant loop. The introduction of additional workpieces causes valve 38 to close completely. Thus, heat energy formerly dissipated from the auxiliary condensing coils 40a to the ambient atmosphere is sufficiently retained within the refrigerant loop 30 of the present invention in order to maintain boiling of the solvent and the energy efficient thermodynamically balanced operation of the apparatus.

During heavy load conditions, the temperature of the water in loop 20 decreases to an even lower temperature. When the water decreases below a predetermined temperature, temperature sensor 58 generates a control signal to the solenoid valves 46 and 48, causing valve 46 to be closed and valve 48 to be opened. This allows refrigerant to flow through the auxiliary evaporator branch 33 and permits the refrigerant flowing through the auxiliary evaporating coils 54a to absorb the necessary heat energy from the ambient atmosphere in order to maintain a balanced system. Fan 42 rotates at constant speed and aids the absorption of heat energy by the refrigerant.

The above arrangement constitutes a safe and energy efficient vapor degreaser which utilizes a binary system and has the capability of efficiency absorbing or emitting heat energy to the ambient atmosphere when necessary to maintain a thermodynamic equilibrium for the desired operation of the degreaser.

While a plurality of chambers is shown in the preferred embodiment as hereinabove described, it is understood that a single chamber or sump may be used to vaporize and condense the solvent. It will also be apparent to those skilled in the art that other modifications may be made without departing from the broad principle and spirit of this invention which shall be limited only by the scope of the appended claim.

What is claimed is:

1. A vapor degreaser comprising:
   a housing including a sump for containing a liquid solvent;
   heating coils disposed in said sump for vaporizing the solvent;

cooling coils disposed around the perimeter of said housing above the sump for condensing vaporized solvent which is returned to said sump;

a refrigeration loop adapted to conduct refrigerant comprising the series connection of a first fluid conducting passage of a heat exchanger, a refrigerant receiver, a dryer, a normally open fluid valve, a thermal expansion valve, a first fluid conducting passage of an evaporator, and a compressor;

a first liquid loop adapted to conduct water or a water based liquid comprising the series connection of a pump, said heating coils, a second fluid conducting passage of said heat exchanger whereby said first and second passages are in heat exchanging relation, and a first liquid reservoir;

a second liquid loop adapted to conduct water or a water based liquid comprising the series connection of a pump, said cooling coils, a second fluid passage of said evaporator whereby said first passage and second passage of said evaporator are in heat exchanging relation, and a second liquid reservoir;

means to maintain thermal balance in said degreaser, further comprising;

a first bypass branch adapted to conduct refrigerant and including a refrigerant pressure regulating valve for causing refrigerant flow therethrough commensurate with the pressure in said refrigeration loop and auxiliary condensing coils coupled between the discharge side of the compressor and a point between said refrigerant receiver and said first fluid conducting passage of the heat exchanger of said refrigeration loop;

a second bypass branch adapted to conduct refrigerant and including a normally closed fluid valve, a thermal expansion valve and auxiliary evaporating coils coupled to the suction side of said compressor and to a point between said normally open fluid valve and said dryer of said refrigeration loop;

a temperature sensing means disposed in said second liquid reservoir coupled to said normally open fluid valve of said refrigerant loop and to said normally closed fluid valve of said second bypass branch for causing at a predetermined temperature below ambient said normally open fluid valve to close and said normally closed fluid valve to open.

2. A vapor degreaser as set forth in claim 1, and forced air cooling means for flowing ambient air over the outside of said auxiliary condensing coils and said auxiliary evaporating coils.

* * * * *